United States Patent
Xiao (10) Patent No.: US 11,418,320 B2
(45) Date of Patent: Aug. 16, 2022

(54) BLOCKCHAIN-BASED DATA PROCESSING METHODS, DEVICES, AND MEDIA

(71) Applicant: BAIDU ONLINE NETWORK TECHNOLOGY (BEIJING) CO., LTD., Beijing (CN)

(72) Inventor: Wei Xiao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 98 days.

(21) Appl. No.: 17/016,161

(22) Filed: Sep. 9, 2020

(65) Prior Publication Data

US 2021/0203475 A1 Jul. 1, 2021

(30) Foreign Application Priority Data

Dec. 31, 2019 (CN) .......................... 201911420985.2

(51) Int. Cl.
*H04L 9/00* (2022.01)
*G06F 21/60* (2013.01)
*H04L 9/08* (2006.01)
*H04L 9/40* (2022.01)

(52) U.S. Cl.
CPC ............ *H04L 9/008* (2013.01); *G06F 21/602* (2013.01); *H04L 9/0825* (2013.01); *H04L 63/0442* (2013.01)

(58) Field of Classification Search
None
See application file for complete search history.

(56) References Cited

U.S. PATENT DOCUMENTS

| | | | |
|---|---|---|---|
| 10,075,288 B1* | 9/2018 | Khedr | ............... H04L 9/008 |
| 2015/0195083 A1* | 7/2015 | Jacquin | ............... H04L 9/14 |
| | | | 380/28 |
| 2017/0070340 A1* | 3/2017 | Hibshoosh | ............ H04L 9/3026 |

(Continued)

FOREIGN PATENT DOCUMENTS

| CN | 106549749 A | 3/2017 |
|---|---|---|
| CN | 108199842 A | 6/2018 |

(Continued)

OTHER PUBLICATIONS

Brakerski, Leveraging Linear Decryption: Rate-1 Fully-Homomorphic Encryption and Time-Lock Puzzles, 2019, pp. 1-25. (Year: 2019).*

(Continued)

*Primary Examiner* — Benjamin E Lanier
(74) *Attorney, Agent, or Firm* — Lathrop GPM LLP (57) ABSTRACT

The disclosure provides a blockchain-based data processing method, a blockchain-based data processing apparatus, an electronic device, and a medium, and relates to a field of blockchain technologies. The method includes: obtaining a delay transaction request and triggering execution of the delay transaction request; during the execution of the delay transaction request, homomorphically encrypting determined data to be disclosed with a delay, to generate delay transaction data containing encrypted delay data, and storing the delay transaction data on an uplink; and when set delay disclosure conditions are met, decrypting the delay transaction data.

18 Claims, 5 Drawing Sheets

(56) References Cited

U.S. PATENT DOCUMENTS

| | | | |
|---|---|---|---|
| 2019/0058580 | A1 | 2/2019 | Tormasov et al. |
| 2019/0182035 | A1* | 6/2019 | Chari ............... H04L 9/0861 |
| 2019/0296907 | A1* | 9/2019 | Versteeg ........... H04L 9/0894 |
| 2019/0347435 | A1* | 11/2019 | Zheng ............... G06F 21/46 |
| 2019/0379646 | A1* | 12/2019 | Mandal .............. H04L 9/0819 |
| 2020/0279233 | A1* | 9/2020 | Nakamura ........... H04L 9/12 |

FOREIGN PATENT DOCUMENTS

| | | | | |
|---|---|---|---|---|
| CN | 109598506 | A | | 4/2019 |
| CN | 110034917 | A | | 7/2019 |
| CN | 110147994 | A | | 8/2019 |
| CN | 110348231 | A | | 10/2019 |
| JP | 2020092414 | A | | 6/2020 |
| KR | 20190035056 | A | | 4/2019 |
| WO | WO-2020016739 | A1 | * | 1/2020 ......... H04L 67/1078 |

OTHER PUBLICATIONS

Chvojka, Versatile and Sustainable Timed-Release Encryption and Sequential Time-Lock Puzzles, 2021, pp. 1-38. (Year: 2021).*

Smith, Towards Timelock Encryption, 2019, pp. 1-53. (Year: 2019).*

Malavolta, Homomorphic Time-Lock Puzzles and Applications, 2019,j pp. 1-27. (Year: 2019).*

Clarkson, Time-Lock Cryptography, 2013, pp. 1-13. (Year: 2013).*

Wang, Z et al. "Survey on privacy preserving techniques for blockchain" Chinese Journal on Internet of Things, vol. 2, No. 3, Sep. 2018, pp. 71-81.

Nakasumi, M. "Information Sharing for Supply Chain Management Based on Block Chain Technology" Jul. 2017 IEEE 19th Conf, on Business Informatics, pp. 140-149.

Chinese Patent Application No. 201911420985.2, Office Action dated Sep. 17, 2021, 7 pages.

Chinese Patent Application No. 201911420985.2, English translation of Office Action dated Sep. 17, 2021, 7 pages.

Japanese Patent Application No. 2020-205937, Office Action dated Dec. 21, 2021, 4 pages.

Japanese Patent Application No. 2020-205937, English translation of Office Action dated Dec. 21, 2021, 3 pages.

Ning, J. et al. "Keeping Time-Release Secrets through Smart Contracts" Nov. 29, 2018, 27 pages.

\* cited by examiner

BLOCKCHAIN-BASED DATA PROCESSING METHODS, DEVICES, AND MEDIA

TECHNICAL FIELD

This application claims priority to Chinese Patent Application No. 201911420985.2, filed on Dec. 31, 2019, the entire contents of which are incorporated herein by reference.

TECHNICAL FIELD

The disclosure relates to a field of computer technologies, and more particularly, to blockchain technologies, especially, a blockchain-based data processing method, a device and a medium.

BACKGROUND

Blockchain technologies are new application patterns adopting computer technologies such as distributed data storage, peer-to-peer transmission, consensus mechanism, and encryption algorithm.

In a blockchain network having a plurality of blockchain nodes, each node may verify transaction data in each block and store the block to ensure fairness of decentralization.

With the use of blockchain technologies in various application scenarios, more demands are proposed, such as timeliness requirements for data disclosure, and requirements of delaying the disclosure of uplink data.

Currently, there is no effective solution for the delay disclosure of the uplink data in the related art.

SUMMARY

In a first aspect, the disclosure provides a blockchain-based data processing method implemented by blockchain nodes. The method includes: obtaining a delay transaction request and triggering execution of the delay transaction request; during the execution of the delay transaction request, homomorphically encrypting determined data to be disclosed with a delay, to generate delay transaction data containing encrypted delay data, and storing the delay transaction data on an uplink; and when set delay disclosure conditions are met, decrypting the delay transaction data.

In a second aspect, the disclosure provides an electronic device. The device includes: at least one processor; and a memory connected in communication with the at least one processor; in which the memory stores instructions executable by the at least one processor, and when the instructions are executed by the at least one processor, the at least one processor are caused to implement the above blockchain-based data processing method.

In a third aspect, an embodiment of the disclosure provides a non-transitory computer-readable storage medium storing computer instructions, in which when the computer instructions are executed, the computer is caused to implement the above blockchain-based data processing method.

The additional effects of the foregoing alternative manners are described below in combination with specific embodiments.

BRIEF DESCRIPTION OF THE DRAWINGS

The accompanying drawings are used to better understand the solutions, and do not constitute a limitation on the disclosure, in which.

DETAILED DESCRIPTION

The following describes the exemplary embodiments of the disclosure with reference to the accompanying drawings. Various details of the embodiments of the disclosure may be included to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

An embodiment of the disclosure provides a blockchain-based data processing method implemented by blockchain nodes. The method includes: obtaining a delay transaction request and triggering execution of the delay transaction request; during the execution of the delay transaction request, homomorphically encrypting determined data to be disclosed with a delay, to generate delay transaction data containing encrypted delay data, and storing the delay transaction data on an uplink; and when set delay disclosure conditions are met, decrypting the delay transaction data.

The above embodiment in the disclosure has the following advantages or beneficial effects. In the process of executing the delay transaction request obtained, the blockchain nodes process the determined data to be disclosed with a delay by introducing homomorphic encryption, which can ensure the security of the encrypted delay data without affecting data verification. Afterwards, the delay transaction data containing the encrypted delay data is stored on the uplink, and when it is determined that the set delay disclosure conditions are met, the delay transaction data stored in the blockchain is decrypted, to realize the delay disclosure of the uplink data in the blockchain, which provides a new idea for the delay disclosure of the uplink data.

Alternatively, during the execution of the delay transaction request, homomorphically encrypting the determined data to be disclosed with a delay, to generate the delay transaction data containing the encrypted delay data, includes: during the execution of the delay transaction request, determining read data to be disclosed with a delay; homomorphically encrypting the read data to be disclosed with a delay, to obtain encrypted read data; performing the delay transaction request based on the encrypted read data to generate encrypted write data; and adding the encrypted delay data to the delay transaction data, in which the encrypted delay data includes the encrypted write data, or the encrypted read data and write data.

The above-mentioned alternative method has the following advantages or beneficial effects. According to the characteristics of determining the data gradually during the execution of the delay transaction request, the read data and write data to be disclosed with a delay, are processed to generate the encrypted delay data, which provides an alternative way for determining the encrypted delay data.

Alternatively, during the execution of the delay transaction request, before homomorphically encrypting the determined data to be disclosed with a delay, the method further includes: during the execution of the delay transaction request, determining data to be disclosed with a delay; and according to an execution type of the data to be disclosed with a delay, determining a corresponding encryption algorithm.

Alternatively, determining the corresponding encryption algorithm according to the execution type of the data to be disclosed with a delay includes: when the data to be disclosed with a delay is numerical data for four arithmetic operations, selecting a fully homomorphic encryption algorithm; when the data to be disclosed with a delay is numerical data for addition operations, selecting an addition homomorphic encryption algorithm; when the data to be disclosed with a delay is numerical data for multiplication operations, selecting a multiplication homomorphic encryption algorithm; and when the data to be disclosed with a delay is text data that does not need to be operated, selecting an asymmetric encryption algorithm.

The above-mentioned alternative method has the following advantages or beneficial effects. By introducing different encryption algorithms, the data to be disclosed with a delay of different execution types are processed, which increases the flexibility and scope of the solutions.

Alternatively, when the set delay disclosure conditions are met, decrypting the delay transaction data includes: decrypting the delay transaction data when delay disclosure conditions specified in the delay transaction request are met; or when receiving a disclosure instruction issued by an initiating user of the delay transaction request, determining that the set delay disclosure conditions are met, and decrypting the delay transaction data.

The above-mentioned alternative method has the following advantages or beneficial effects. By introducing the delay disclosure conditions, the delay disclosure of the uplink data in the blockchain can be realized. Meanwhile, the delay disclosure conditions are flexibly specified in the delay transaction request in advance according to the actual requirements, or issued by the initiating user of the delay transaction request subsequently, which further increases the flexibility of the solutions.

Alternatively, during the execution of the delay transaction request, homomorphically encrypting the determined data to be disclosed with a delay, includes: during the execution of the delay transaction request, adopting an encryption key provided by an initiating user of the delay transaction request to homomorphically encrypt the determined data to be disclosed with a delay.

The above-mentioned alternative method has the following advantages or beneficial effects. By limiting the encryption key for homomorphic encryption of the data to be disclosed with a delay, to be provided by the initiating user of the delay transaction request, the security of the data to be disclosed with a delay is further ensured.

Alternatively, before decrypting the delay transaction data, the method further includes: obtaining a disclosure transaction request initiated by the initiating user, and obtaining a decryption key from the disclosure transaction request.

The above-mentioned alternative method has the following advantages or beneficial effects. The decryption key is provided by the initiating user of the delay transaction request. For example, the decryption key is carried in the disclosure transaction request initiated by the initiating user of the delay transaction request to ensure the security of the decryption key. The blockchain nodes obtain the decryption key from the disclosure transaction request, which is an alternative way of obtaining the decryption key.

Alternatively, when the set delay disclosure conditions are met, decrypting the delay transaction data includes: when the set delay disclosure conditions are met, providing a decryption key provided by the initiating user to a query user of the delay transaction data for decryption process.

Alternatively, providing the decryption key provided by the initiating user to the query user of the delay transaction data includes: initiating uplink storage of the decryption key provided by the initiating user for disclosure; or performing locally storage of the decryption key provided by the initiating user in association with the delay transaction request for decryption process when querying the delay transaction data.

The above-mentioned alternative method has the following advantages or beneficial effects. The query user can obtain the decryption key locally from the blockchain or the blockchain nodes for decryption process, and then obtain the delay data.

Alternatively, after homomorphically encrypting the determined data to be disclosed with a delay, the method further includes: establishing a correspondence between the encryption key and the encrypted delay data, and establishing a bidirectional index.

The above-mentioned alternative method has the following advantages or beneficial effects. By establishing the bidirectional index between the encryption key and the encrypted delay data, a new idea is provided for quickly querying the decryption key corresponding to the encryption key.

Alternatively, during the execution of the delay transaction request, homomorphically encrypting the determined data to be disclosed with a delay, to generate the delay transaction data containing the encrypted delay data, includes: during the execution of the delay transaction request, determining read data and write data to be disclosed with a delay, in which the read data and write data are stored in a form of key-value pairs; and encrypting a key domain of the key-value pairs by using a non-homomorphic encryption algorithm, and encrypting a value domain of the key-value pairs by using a homomorphic encryption algorithm, to generate the delay transaction data containing the encrypted delay data.

The above-mentioned alternative method has the following advantages or beneficial effects. In the case that the read data and the write data in the data to be disclosed with a delay are stored in the form of key-value pairs, different encryption algorithms for encryption is realized by combining the characteristics of the key domain and the value domain of the actual key-value pairs to further increase the flexibility of the solutions.

Alternatively, during the execution of the delay transaction request, homomorphically encrypting the determined data to be disclosed with a delay, to generate the delay transaction data containing the encrypted delay data, includes: when local nodes are pre-execution nodes of the delay transaction request, performing the delay transaction request on read data in a plaintext state to determine write data in a plaintext state; and homomorphically encrypting the read data and the write data as the encrypted delay data of the data to be disclosed with a delay, and adding the encrypted delay data to the delay transaction data.

The above-mentioned alternative method has the following advantages or beneficial effects. In the scenario where the blockchain nodes are pre-execution nodes for the delay transaction request, the blockchain nodes first perform calculations on the data in the plaintext state, and then perform homomorphic encryption on the read data and write data in the plaintext state, and there is no need for homomorphic encryption before calculation, which improves the calculation speed.

Alternatively, when the set delay disclosure conditions are met, decrypting the delay transaction data includes: when the set delay disclosure conditions are met, and a query request for the delay transaction data is received, decrypting the delay transaction data containing the encrypted delay data and feed backing the delay transaction data to a query user.

The above-mentioned alternative method has the following advantages or beneficial effects. An alternative way of decrypting the delay transaction data, which is more suitable for offline data transmission, is provided.

Figure 1:
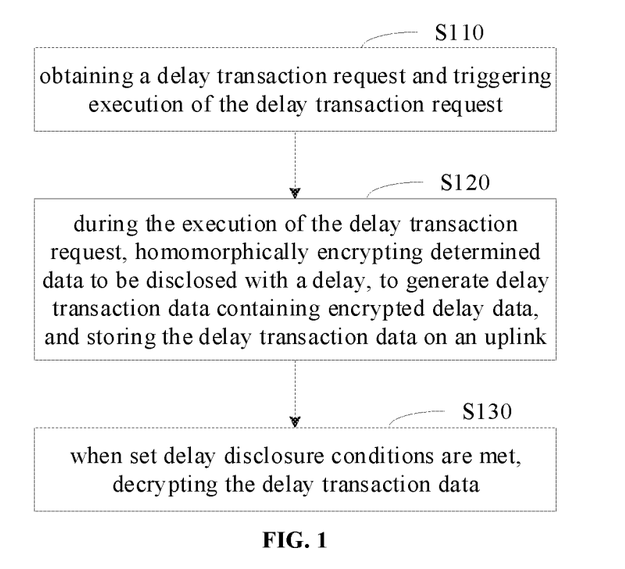
FIG. 1 is a flowchart of a blockchain-based data processing method according to an embodiment of the disclosure.

FIG. 1 is a flowchart of a blockchain-based data processing method according to an embodiment of the disclosure. This embodiment is applicable for processing data, and is particularly applicable for processing data in a scenario with the requirements of the delay disclosure of the data, to meet the timeliness requirements of the data disclosure. In this embodiment, the blockchain-based data processing method is executed by the blockchain nodes, specifically the blockchain nodes on which the transaction request is initiated, or other nodes of obtaining the transaction request in the blockchain network.

The solutions of the embodiments of the disclosure may be implemented by a blockchain-based data processing apparatus, which may be implemented in software and/or hardware, and may be integrated in a computing device that carries blockchain nodes. As illustrated in FIG. 1, the blockchain-based data processing method provided by this embodiment may include the following.

At block S110, a delay transaction request is obtained and execution of the delay transaction request is triggered.

In the embodiment, the delay transaction request may be a transaction request with requirements for the delay disclosure of the data. From the perspective of whether there are requirements for the delay disclosure, transaction requests transmitted in the blockchain network include delay transaction requests and ordinary transaction requests. In order to distinguish the delay transaction request from the ordinary transaction request, further, identification information such as a specific identifier may be added to the delay transaction request. Alternatively, the delay transaction request may be a transaction request based on a smart contract or a transaction request based on a field format.

Alternatively, local nodes may obtain the delay transaction request initiated locally. For example, if the user has the requirement for the delay disclosure of the data, he/she may initiate the delay transaction request through the local nodes, and then the local nodes may obtain the locally initiated delay transaction request; or, when the local nodes receive the delay transaction processing requirements sent by a trigger mechanism such as a third-party device (such as a client, a terminal device, or a server), the delay transaction request is generated and initiated according to the delay transaction processing requirements.

The local nodes may also obtain the delay transaction request initiated by other blockchain nodes and transmitted in the blockchain network.

In detail, the local nodes may execute the delay transaction request after acquiring the delay transaction request. For example, the local nodes may execute the acquired transaction request every time when they acquire any transaction request, and then may execute the delay transaction request after acquiring the delay transaction request. Alternatively, the local nodes may process the transaction requests in batches. For example, if the local nodes determine that the current state meets the set batch processing conditions, the acquired transaction requests are processed concurrently, in which the current state meeting the set batch processing conditions may be that the number of acquired transaction requests reaches the set number value, or the current time reaches the set processing cycle; then after the local nodes obtain the delay transaction request, and if it is determined that the current state meets the set batch processing conditions, the acquired transaction requests are processed concurrently, and the delay transaction request is executed.

At block S120, during the execution of the delay transaction request, determined data to be disclosed with a delay is homomorphically encrypted to generate delay transaction data containing encrypted delay data, and the delay transaction data is stored on an uplink.

In this embodiment, during the execution process, the delay transaction request may rely on some existing data in the blockchain, and may change, delete, or add some data, which is the data involved in the delay transaction request. The data to be disclosed with a delay is the data that needs to be delayed to be disclosed in the data involved in the delay transaction request. Alternatively, the delay transaction request may specify which of the data involved in the delay transaction request needs to be delayed to be disclosed and which data does not need to be delayed to be disclosed. Further, the data that needs to be delayed to be disclosed may have a specific identifier to be distinguished from the data that does not need to be delayed to be disclosed. Furthermore, after acquiring the delay transaction request, the local nodes can determine all or part of data of the transaction request as the data to be disclosed with a delay according to the instructions in the delay transaction request.

Homomorphic encryption is a special encryption method that processes ciphertext directly, which may have the identical result with encrypting a processing result after processing plaintext. Correspondingly, the encrypted delay data is encrypted data obtained by performing homomorphic encryption on the data to be disclosed with a delay.

Alternatively, the delay transaction request can also specify the homomorphic encryption algorithm used for homomorphic encryption of the data to be disclosed with a delay, and then during the execution of the delay transaction request, the local nodes may use the homomorphic encryption algorithm specified in the delay transaction request to homomorphically encrypt the data to be disclosed with a delay to obtain the encrypted delay data, and add the encrypted delay data to the delay transaction data and store the delay transaction data on the blockchain. The delay transaction data may include the encrypted delay data, and may also include involved plaintext data that is not required to be delayed to be disclosed during the execution of the delay transaction request, and the transaction identifier of the delay transaction request.

Alternatively, the local nodes may also determine the encryption algorithm used to encrypt the data to be disclosed with a delay according to the execution type of the data to be disclosed with a delay. Further, the execution types of the data to be disclosed with a delay are different, and the encryption algorithms used may be different. For example, if the data to be disclosed with a delay is numerical data that needs to be calculated, the homomorphic encryption algorithm is correspondingly selected according to the type of operation (such as addition and subtraction, multiplication and division). Usually, text data does not require specific calculation and process, and if the data to be disclosed with a delay is text data that does not need to be calculated, a non-homomorphic encryption algorithm such as an asymmetric encryption algorithm is selected.

For example, during the execution of the delay transaction request, before homomorphic encryption of the determined data to be disclosed with a delay, the method further includes the following. During the execution of the delay transaction request, the data to be disclosed with a delay is determined, and the corresponding encryption algorithm is determined according to the execution type of the data to be disclosed with a delay. In detail, the local nodes determine the data to be disclosed with a delay during the execution of the delay transaction request according to the instructions in the delay transaction request; afterwards, the local nodes select the corresponding encryption algorithm to encrypt the data to be disclosed with a delay by identifying the execution type of the data to be disclosed with a delay. Alternatively, if the local nodes recognize that the data to be disclosed with a delay is numerical data that needs to be operated, the corresponding homomorphic encryption algorithm is selected according to the type of operation required (such as addition and subtraction, multiplication and division). For example, if the data to be disclosed with a delay is numerical data for four arithmetic operations, a fully homomorphic encryption algorithm is selected, such as the Gentry algorithm; if the data to be disclosed with a delay is numerical data for addition operations, an addition homomorphic encryption algorithm is selected, such as Paillier algorithm; if the data to be disclosed with a delay is numerical data for multiplication operations, a multiplication homomorphic encryption algorithm is selected, such as RSA algorithm. If the local nodes recognize that the data to be disclosed with a delay is text data that does not need to be calculated, an asymmetric encryption algorithm is selected.

It is understood that, in this embodiment, by introducing different encryption algorithms, the data to be disclosed with a delay, of different types of execution operations, may be processed, which increases the flexibility and scope of the solutions.

In addition, it is noted that the existing encrypted storage mechanism is mainly for transaction requests initiated by users. If the content of the transaction request is encrypted information, the encrypted information is stored on the uplink, and the decryption key is provided at the right moment. Since the blockchain network cannot completely understand the encrypted content, the encrypted content cannot be processed, and the information can only be stored after encryption. Generally, text data does not require specific calculation and process, and only needs to be encrypted and stored, while information that requires logical operation cannot be processed in an encrypted state. For example, in a case that the information is logical information, such as some data+1, since the decryption key is not published, the blockchain network cannot understand the encrypted information, the operation of performing +1 on the data cannot be executed. Therefore, the processing of the encrypted information needs to be delayed until the encrypted information is decrypted. In this way, if the processing of the encrypted information leads to conflict with other processed transaction requests and needs to be rolled back, this case can only be found when decrypting, and then all previously processed transaction requests need to be rolled back. This is equivalent to that a transaction request is not verified by substantial processing when the encrypted information is uploaded on the uplink, and it may be substantially processed and verified until being delayed to decrypting.

The disclosure adopts the homomorphic encryption method to process the data to be disclosed with a delay, and when the data to be disclosed with a delay and the homomorphic encryption algorithm are determined, the encrypted delay data obtained by homomorphic encryption of the data to be disclosed with a delay is unique, thus the disclosure can realize the effect of checking whether the data conflicts in real time. For example, the local nodes may use the homomorphic encryption algorithm of the processed delay transaction request to process data of the currently acquired transaction request, and compare the encrypted delay data obtained after processing with the encrypted delay data stored on the blockchain. If the encrypted delay data obtained after processing and the encrypted delay data stored on the blockchain are inconsistent, it is determined that the processed delay transaction request does not conflict with the currently acquired transaction request; otherwise, it is determined that the processed delay transaction request conflicts with the currently acquired transaction request.

At block S130, when set delay disclosure conditions are met, the delay transaction data is decrypted. In the embodiment, the delay disclosure conditions are conditions that are predetermined and are supposed to be met when the encrypted delay data stored in the public blockchain may be disclosed, or conditions that are predetermined and met when plaintext of the encrypted delay data may be obtained by other users. For example, it may include at least one of the following: 1) the current block height reaches a set height value; 2) the current time reaches a set disclosure time; 3) the number of received query requests for the delay transaction data reaches a set threshold; and 4) other trigger mechanisms are received, such as the disclosure instruction issued by the initiating user of the delay transaction request.

Further, the delay disclosure conditions can be specified in the delay transaction request, can also be determined by the initiator of the delay transaction request at any time according to the actual situation of the initiator, or can be determined and negotiated by the nodes in the blockchain network and stored in the uplink.

Alternatively, in the case where the delay disclosure conditions are specified in the delay transaction request, when the set delay disclosure conditions are met, decrypting the delay transaction request may be: decrypting the delay transaction request when the delay disclosure conditions specified in the delay transaction request are met. For example, the delay disclosure conditions specified in the delay transaction request may be that the number of received query requests for the delay transaction data reaches the set threshold, and then the local nodes may count the number of the received query requests for the delay transaction data, and when it is determined that the number reaches the set threshold, such as equal to or greater than the set threshold, the delay transaction data may be decrypted.

For example, in the case where the delay disclosure conditions may be determined by the initiator of the delay transaction request at any time according to the actual situation of the initiator, at this time, the delay disclosure conditions may be a disclosure instruction issued by the user who initiated the delay transaction request. Further, when the set delay disclosure conditions are met, decrypting the delay transaction request may be that when receiving the disclosure instruction issued by the initiating user of the delay transaction request, and it is determined that the set delay disclosure conditions are met, the local nodes decrypt the delay transaction data.

It is understood that the delay disclosure conditions in this embodiment are specified in the delay transaction request in advance, that is, specified by the initiating user of the delay transaction request, or the delay disclosure conditions in this embodiment are subsequently issued by the initiating user of the delay transaction request. In the case of meeting the timeliness of data disclosure requirements of the users, user satisfaction is further improved.

In addition, in the case where the delay disclosure conditions are negotiated and determined by the nodes in the blockchain network and stored on the uplink, when the set delay disclosure conditions are met, the decryption process of the delay transaction request includes that when determining that the current state (which can include at least one of the current block height and the current time) meets the delay disclosure conditions stored in the historical block, the delay transaction data is decrypted; or if it is determined that the number of query requests received for the delay transaction data meets the delay disclosure conditions stored in the historical block, the delay transaction data is decrypted.

In detail, when it is determined that the set delay disclosure conditions are met, the local nodes decrypt the delay transaction data stored in the blockchain, and then the decrypted processing result can be stored on the uplink, so that any user can obtain the decrypted processing results from the blockchain, or the local nodes send the decrypted processing result to the user, for example, the user of sending the query request.

Further, when the set delay disclosure conditions are met, the local nodes decrypt the delay transaction data, which may include: when the set delay disclosure conditions are met, if a query request for the delay transaction data is received, decrypting the delay transaction data containing the encrypted delay data and feed backing the delay transaction data to the query user. In detail, when the set delay disclosure conditions are met, the corresponding delay transaction data is obtained from the blockchain according to the transaction identifier in the query request when receiving the query request for the delay transaction data from any query party, and the encrypted delay data in the delay transaction data can be decrypted, and the decrypted processing result can be provided to the query party.

With the technical solutions of the embodiments of the disclosure, in the process of executing the acquired delay transaction request, the blockchain nodes process the determined data to be disclosed with a delay by introducing homomorphic encryption, which can ensure the security of the encrypted delay data without affecting data verification. Afterwards, the delay transaction data containing the encrypted delay data is stored on the uplink, and when it is determined that the set delay disclosure conditions are met, the delay transaction data stored in the blockchain is decrypted, to realize the delay disclosure of the uplink data in the blockchain, which provides a new idea for the delay disclosure of the uplink data.

Figure 2:
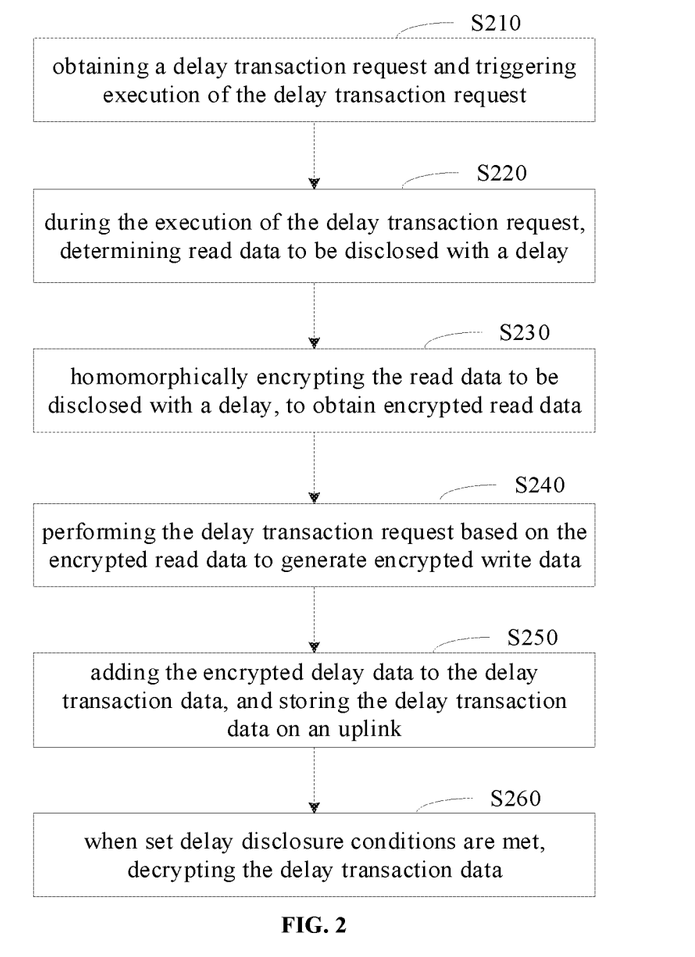
FIG. 2 is a flowchart of a blockchain-based data processing method according to an embodiment of the disclosure.

FIG. 2 is a flowchart of a blockchain-based data processing method according to an embodiment of the disclosure. Based on the above embodiment, this embodiment further may interpret homomorphically encrypting the determined data to be disclosed with a delay during the execution of the delay transaction request to generate the delay transaction data containing the encrypted delay data. As illustrated in FIG. 2, the blockchain-based data processing method according to this embodiment may include the following.

At block S210, a delay transaction request is obtained and execution of the delay transaction request is triggered.

At block S220, during the execution of the delay transaction request, read data to be disclosed with a delay is determined.

In the embodiment, the data to be disclosed with a delay may include data related to the delay transaction request. Further, the data related to the delay transaction request may include read data and write data. The read data refers to data that needs to be read from local data during the execution of the delay transaction request, and the write data refers to the data to be updated (such as addition, change, or deletion) after the execution of the delay transaction request. Furthermore, in the delay transaction request, it is possible to specify which of the data to be disclosed with a delay is the read data to be disclosed with a delay, and which is the write data to be disclosed with a delay. That is, the data to be disclosed with a delay may include the read data to be disclosed with a delay, and may also include the write data to be disclosed with a delay. In addition, it is noted that the read data and the write data are not determined at once, but are determined gradually during the execution of the delay transaction request.

In detail, in the execution process of the delay transaction request, the local nodes may first determine the read data to be disclosed with a delay according to the instructions in the delay transaction request.

At block S230, the read data to be disclosed with a delay is homomorphically encrypted, to obtain encrypted read data.

In detail, after determining the read data, the local nodes may select a corresponding homomorphic encryption algorithm according to the execution type of the read data to homomorphically encrypt the read data. For example, if the read data is numerical data for four arithmetic operations, a fully homomorphic encryption algorithm is selected.

At block S240, the delay transaction request is performed based on the encrypted read data to generate encrypted write data.

Alternatively, the local nodes call a smart contract to execute the delay transaction request based on the encrypted read data, and further generate the encrypted write data. Or, the local nodes also execute the delay transaction request based on the encrypted read data according to the execution method of the transaction request in a field format, and further generate the encrypted write data.

At block S250, the encrypted delay data is added to the delay transaction data and stored on the uplink.

In this embodiment, the encrypted delay data may include the encrypted write data, or the encrypted delay data may include the encrypted read data and write data. In order to facilitate direct verification that the encrypted write data is determined by the encrypted read data, the encrypted delay data in this embodiment may include the encrypted read data and write data.

In detail, after determining the encrypted delay data, the local nodes may add the encrypted delay data to the delay transaction data and store the delay transaction data on the uplink.

Further, if the local nodes are the blockchain nodes on which the initiating user initiates the delay transaction request, that is, the local nodes are the pre-execution nodes of the delay transaction request, the local nodes may perform calculations on the data in the plaintext state first, and then homomorphically encrypt the read data and the write data in the plaintext state. There is no need to homomorphically encrypt the data before calculating, so as to increase the calculation speed. For example, during the execution of the delay transaction request, the determined data to be disclosed with a delay is homomorphically encrypted to obtain the delay transaction data containing the encrypted delay data. That is, if the local nodes are the pre-execution nodes of the delay transaction request, the delay transaction request is executed on the read data in the plaintext state to determine the write data in the plaintext state; the read data and the write data are homomorphically encrypted as the encrypted delay data of the data to be disclosed with a delay and added to the delay transaction data.

In the case where the local nodes are the pre-execution nodes of the delay transaction request, after adding the encrypted delay data to the delay transaction data, the local nodes may store the delay transaction request in association with the delay transaction data in the block and sent them to the blockchain network, so that other nodes in the blockchain network may perform verification and storage.

If the local nodes are another nodes that obtain the delay transaction request from the blockchain network, that is, the local nodes are the verification nodes of the delay transaction request, the local nodes may homomorphically encrypt the read data, and then compare the homomorphic encryption result of the read data to the encrypted read data in the delay transaction data in association with the delay transaction request and sent by the pre-execution nodes; if the agreement is confirmed, the local nodes execute action at block 240 to determine the encrypted write data, and compare the encrypted write data to the encrypted write data in the delay transaction data in association with the delay transaction request and sent by the pre-execution nodes. In the case of confirmation of agreement, the two are stored on the uplink. In this embodiment, the two-level verification method can reduce the probability of pre-executing nodes fraud.

At block S260, when set delay disclosure conditions are met, the delay transaction data is decrypted.

The technical solutions according to the embodiments of the disclosure, according to the characteristics of determining the data gradually during the execution of the delay transaction request, the read data and write data to be disclosed with a delay, are processed to generate the encrypted delay data, which provides an alternative way for determining the encrypted delay data.

Figure 3:
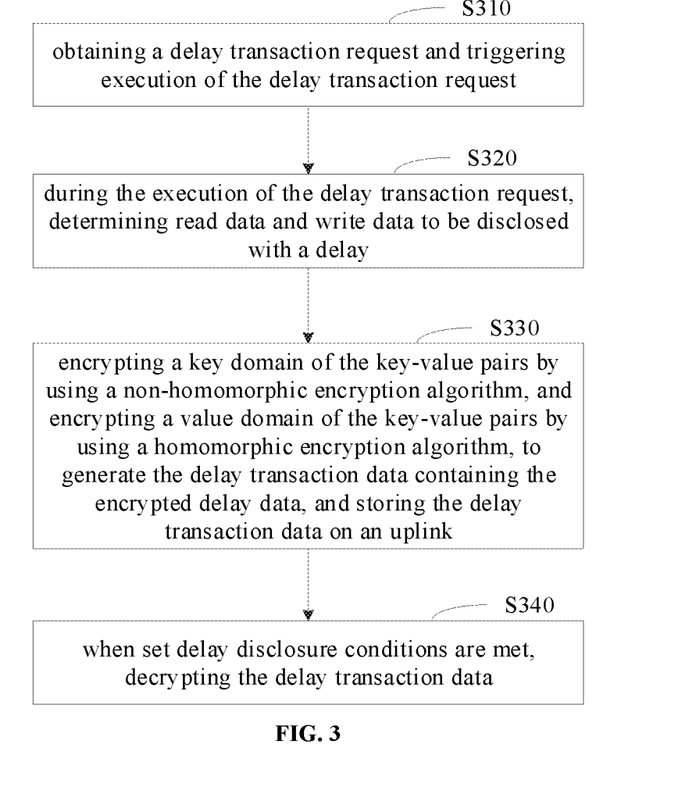
FIG. 3 is a flowchart of a blockchain-based data processing method according to an embodiment of the disclosure.

FIG. 3 is a flowchart of a blockchain-based data processing method according to an embodiment of the disclosure. Based on the above embodiments, this embodiment further may interpret homomorphically encrypting the determined data to be disclosed with a delay during the execution of the delay transaction request to generate the delay transaction data containing the encrypted delay data, and specifically describe the storage form of the data to be disclosed with a delay. As illustrated in FIG. 3, the blockchain-based data processing method according to this embodiment may include the following.

At block S310, a delay transaction request is obtained and execution of the delay transaction request is triggered.

At block S320, during the execution of the delay transaction request, read data and write data to be disclosed with a delay, are determined.

In detail, in the execution process of the delay transaction request, the local nodes may first determine the read data to be disclosed with a delay; afterwards, the delay transaction request may be executed based on the read data to generate the write data. The read data and the write data can be stored in the form of key-value pairs, and also be stored in other forms. In order to facilitate the query, in this embodiment, the read data and the write data are stored in the form of key-value pairs.

At block S330, a key domain of the key-value pairs is encrypted by using a non-homomorphic encryption algorithm, and a value domain of the key-value pairs is encrypted by using a homomorphic encryption algorithm, to generate the delay transaction data containing the encrypted delay data, and the delay transaction data containing the encrypted delay data is stored on the uplink.

In the case where the read data and the write data are stored in the form of key-value pairs, since the key domain of the key-value pairs is used for identification, it is usually text data, which does not need to be operated, and a non-homomorphic encryption algorithm, for example, the asymmetric encryption algorithm, can be used to encrypt the key domain of the key-value pairs. For the value domain of the key-value pairs, if the value domain is text data that does not need to be operated, a non-homomorphic encryption algorithm, such as an asymmetric encryption algorithm, can be used to encrypt the value domain of the key-value pairs; if the value domain is all or at least part of numerical data, a homomorphic encryption algorithm may be used to encrypt the value domain of the key-value pairs. In addition, in the case where the value domain is all or at least part of the numerical data, if it is determined according to the delay transaction request that no calculation is required for this execution, a non-homomorphic encryption algorithm can also be used to encrypt the value domain of the key-value pairs.

Alternatively, the local nodes are another nodes of obtaining the delay transaction request from the blockchain network, that is, the local nodes are the verification nodes of the delay transaction request. After the local nodes determine the read data to be disclosed with a delay, the non-homomorphic encryption algorithm is adopted to encrypt the key domain of the key-value pairs involved in the read data, meanwhile, the homomorphic encryption algorithm is adopted to encrypt the value domain of the key-value pairs involved in the read data; afterwards, the delay transaction request is executed based on the encrypted read data to generate the encrypted write data. The encrypted write data and read data can be added to the delay transaction data as the encrypted delay data and stored on the uplink.

If the local nodes are the pre-execution nodes of the delay transaction request, the local nodes first execute the delay transaction request on the read data in the plaintext state to determine the write data in the plaintext state; and in the case where the read data and write data are stored as the key-value pairs, a non-homomorphic encryption algorithm can be used to encrypt the key domain of the key-value pairs, and a homomorphic encryption algorithm can be used to encrypt the value domain of the key-value pairs, to generate the delay transaction data containing the encrypted delay data and store the data on the uplink. Further, if the algorithms for encrypting the key and value domains may be not unique, the local nodes add the identifiers of the algorithms to the delay transaction data, and then store the delay transaction request in association with the delay transaction data on the block and sent them to the blockchain network for verification and storage by other nodes in the blockchain network.

At block S340, when set delay disclosure conditions are met, the delay transaction data is decrypted.

In the case that the read data and the write data are stored in the form of key-value pairs, alternatively, when the local nodes meet the set delay disclosure conditions, if any user query request for the delay transaction data is received, the encrypted key domain is determined according to the transaction identifier in the query request (if the algorithm for encrypting the key domain is f1 ( ) the encrypted key domain can be expressed as f1 (key)), and then the encrypted value domain is determined according to the encrypted key domain (if the algorithm for encrypting the value domain is f2 ( ) the encrypted value domain can be expressed as f2 (value)); the decryption key provided by the initiating user can then be used to decrypt the encrypted value domain, i.e., f2' (f2 (value)) is executed to obtain the value, and then feedback the value to the user.

With the technical solutions of the disclosure, in the case where the read data and the write data are stored as the key-value pairs, according to the characteristics of the key domain and the value domain of the actual key-value pairs, different encryption algorithms are selected for encryption, further increasing the flexibility of the solutions.

Further, the local nodes may include an application layer, a logical storage layer, and a physical storage layer, which can be any software that implements any function and generate various data processing requests. In an embodiment, the application layer is implemented as software for realizing the function of the blockchain nodes, which may specifically include software required to support normal operation of the local blockchain of the blockchain nodes, such as virtual machines and other application software related to the blockchain. The main function of the software in the blockchain application layer is to generate transaction requests. The logical storage layer is configured to execute the transaction request obtained from the application layer, and transfer the execution result to the physical storage layer for storage.

Alternatively, in the case where the local nodes include an application layer, a logical storage layer, and a physical storage layer, in the execution process of the delay transaction request, determining the read data and write data to be disclosed with a delay, and using the homomorphic encryption algorithm to encrypt the key domain of the key-value pairs, may include: during the execution of the delay transaction request, the logical storage layer determining the read data and write data to be disclosed with a delay and using a non-homological encryption algorithm to encrypt the key domain of the key value pairs.

In detail, the application layer may specify the data to be disclosed with a delay in the delay transaction request. Then, after the logical storage layer obtains the delay transaction request from the application layer, during the execution of the delay transaction request, the read data and the write data to be disclosed with a delay are determined according to the instructions in the delay transaction request, and the key field and the value field of the key-value pairs can be encrypted by using the action at block S330 to obtain the encrypted delay data, and then the encrypted delay data is transferred to the physical storage layer for storage.

Figure 4:
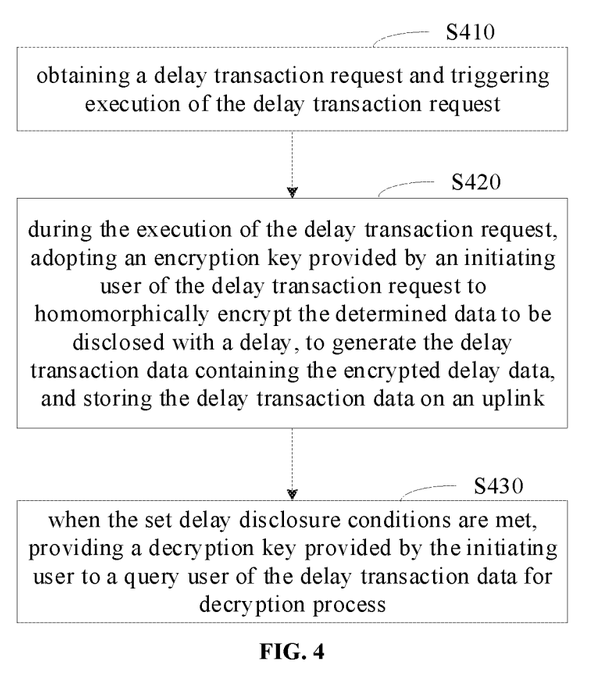
FIG. 4 is a flowchart of a blockchain-based data processing method according to an embodiment of the disclosure.

FIG. 4 is a flowchart of a blockchain-based data processing method according to an embodiment of the disclosure. Based on the above embodiments, this embodiment further may interpret homomorphically encrypting the determined data to be disclosed with a delay during the execution of the delay transaction request to generate the delay transaction data containing the encrypted delay data, and specifically describe the encryption key for performing homomorphic encryption on the data to be disclosed with a delay. As illustrated in FIG. 4, the blockchain-based data processing method according to this embodiment may include the following.

At block S410, a delay transaction request is obtained and execution of the delay transaction request is triggered.

At block S420, during the execution of the delay transaction request, an encryption key provided by an initiating user of the delay transaction request is adopted to homomorphically encrypt the determined data to be disclosed with a delay to generate delay transaction data containing encrypted delay data, and the delay transaction data is stored on an uplink.

In this embodiment, the encryption key used to encrypt the data to be disclosed with a delay may be provided by the initiating user, for example, a public key in the asymmetric keys of the initiating user of the delay transaction request. Alternatively, the initiating user can provide the encryption key to the local nodes in an offline manner or in an online manner. For example, the initiating user can use the local nodes' public key to encrypt the encryption key, and carries the key in the delay transaction request and sent to the local nodes. In order to ensure the security of the data, the initiating user periodically changes the encryption key and provides it to the local nodes.

In detail, in the execution process of the delay transaction request, the local nodes may use the encryption key provided by the initiating user of the delay transaction request to homomorphically encrypt the determined data to be disclosed with a delay, and then obtain the encrypted delay data, after which the encrypted delay data is added to the delay transaction data and stored on the uplink.

It is understood that, generally, the user may select the trustable blockchain node for initiating the transaction request, and then if the local nodes are the blockchain nodes on which the delay transaction request is initiated by the user, that is, the local nodes are the pre-execution nodes of the delay transaction request, the local nodes may also generate the encryption key according to set key generation rules. For example, the local nodes may generate the encryption key in a pre-set trusted space according to the key generation rules to ensure that the encryption key is not leaked.

Furthermore, if the local nodes are the pre-execution nodes of the delay transaction request, after acquiring the delay transaction request, the local nodes may first generate the encryption key according to the key generation rules, and then execute the delay transaction request. In the process, the generated encryption key is used to homomorphically encrypt the determined data to be disclosed with a delay, thereby obtaining the encrypted delay data, and then the encrypted delay data is added to the delay transaction data and stored on the uplink.

At block S430, when set delay disclosure conditions are met, a decryption key provided by the initiating user is provided to a query user of the delay transaction data for decryption process.

In this embodiment, when the encryption key is provided by the initiating user, the corresponding decryption key may also be provided by the initiating user, for example, a private key in the asymmetric keys of the initiating user. For example, before decrypting the delay transaction data, the decryption key provided by the initiating user is obtained. Alternatively, the initiating user can provide the decryption key to the local nodes in an offline manner or in an online manner, for example, the initiating user can add the decryption key to the disclosure transaction request and initiate, and then the local nodes obtain the disclosure transaction request initiated by the initiating user, and obtain the decryption key from the disclosure transaction request. In order to ensure the security of the decryption key, the initiating user can also use the local nodes' public key to encrypt the decryption key, and then carry the key in the disclosure transaction request and send to the local nodes.

In addition, if the encryption key is generated by the local nodes, based on the characteristics of the asymmetric keys, the local nodes may generate the decryption key while generating the encryption key.

In detail, after the local nodes obtain the decryption key, the decryption key is stored in association with the delay transaction request, and when it is determined that the set delay disclosure conditions are met, the decryption key provided by the initiating user is provided to the query user of the delay transaction data to the user for decryption processing.

Alternatively, the local nodes may use one of the following alternative methods to provide the decryption key provided by the initiating user to the query user of the delay transaction data: 1) storing the decryption key provided by the initiating user on the uplink for disclosure, so that the query user can query the blockchain to obtain the decryption key; 2) storing the decryption key provided by the initiating user locally in association with the delay transaction request for decryption process when querying the delay transaction data, so that the query user may obtain the decryption key from the local nodes; 3) transferring the decryption key provided by the initiating user to other nodes trusted by the local nodes, so that other nodes may store the decryption key provided by the initiating user locally in association with the delay transaction request for decryption process when querying the delay transaction data, and then the query user can obtain the decryption key from other nodes.

In addition, the local nodes also directly provide the decrypted processing result to the query user. For example, when the local nodes receive any query request from the query user for the delay transaction data, the target delay transaction request is determined according to the transaction identifier in the query request; then, based on a relationship locally stored between decryption keys and delay transaction requests, the decryption key used to decrypt the delay transaction data corresponding to the target delay transaction request is determined, and then the decryption key is used to decrypt the delay transaction data corresponding to the target delay transaction request, and the decrypted processing result is fed back to the querying user, or the local nodes store the decrypted processing result on the uplink.

The technical solutions according to the embodiments of the disclosure limits that the encryption key for homomorphic encryption of the data to be disclosed with a delay and the decryption key for decrypting the delay transaction data may be provided by the initiating user of the delay transaction request, thereby further ensuring the security of the data to be disclosed with a delay.

In order to facilitate subsequent quick query to locate the decryption key, alternatively, after homomorphic encryption of the determined data to be disclosed with a delay, the local nodes also establish the correspondence between the encryption key and the encrypted delay data, and establish a bidirectional index. For example, an index table that uses the encryption key as the index term, and the encrypted delay data as the index result, may be established, and another index table that uses the encrypted delay data as the index term, and the encryption key as the index result, may be established. Alternatively, the local nodes establish a bidirectional index between the encryption key and the transaction identifier.

For example, after acquiring a query request for the delay transaction data from any user, the local nodes may determine the encrypted delay data according to the delay transaction data, and query the pre-established index table between encryption keys and encrypted delay data to determine the encryption key associated with the encrypted delay data; then the decryption key is determined based on the encryption key associated with the encrypted delay data, and the decryption key is used to decrypt the encrypted delay data and feedback to the user.

Figure 5:
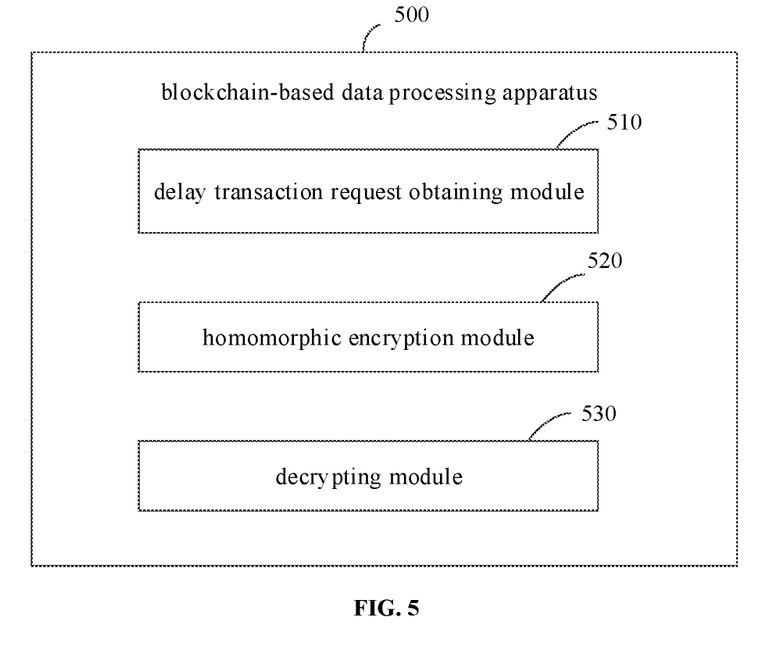
FIG. 5 is a block diagram of a blockchain-based data processing apparatus according to an embodiment of the disclosure.

FIG. 5 is a block diagram of a blockchain-based data processing apparatus according to an embodiment of the disclosure. The apparatus can be configured in the blockchain nodes, to execute the blockchain-based data processing method according to any above embodiment of the disclosure, and has corresponding function modules and beneficial effects of the execution method. As illustrated in FIG. 5, the blockchain-based data processing apparatus 500 includes: a delay transaction request obtaining module 510, a homomorphic encryption module 520, and a decrypting module 530.

The delay transaction request obtaining module 510 is configured to obtain a delay transaction request and trigger execution of the delay transaction request.

The homomorphic encryption module 520 is configured to, during the execution of the delay transaction request, homomorphically encrypt determined data to be disclosed with a delay, to generate delay transaction data containing encrypted delay data, and store the delay transaction data on an uplink.

The decrypting module 530 is configured to, when set delay disclosure conditions are met, decrypt the delay transaction data.

With the technical solutions of the embodiments of the disclosure, in the process of executing the delay transaction request obtained, the blockchain nodes process the determined data to be disclosed with a delay by introducing homomorphic encryption, which can process the determined data to be disclosed with a delay to ensure the security of the encrypted delay data without affecting data verification. Afterwards, the delay transaction data containing the encrypted delay data is stored on the uplink, and when it is determined that the set delay disclosure conditions are met, the delay transaction data stored in the blockchain is decrypted, to realize the delay disclosure of the uplink data in the blockchain, which provides a new idea for the delay disclosure of the uplink data.

For example, the homomorphic encryption module 520 is configured to: during the execution of the delay transaction request, determine read data to be disclosed with a delay; homomorphically encrypt the read data to be disclosed with a delay, to obtain encrypted read data; perform the delay transaction request based on the encrypted read data to generate encrypted write data; and add the encrypted delay data to the delay transaction data, in which the encrypted delay data includes the encrypted write data, or the encrypted read data and write data.

For example, the above apparatus further includes: a data determination unit, configured to, during the execution of the delay transaction request and before homomorphically encrypting the determined data to be disclosed with a delay, determine the data to be disclosed with a delay; and an encryption algorithm determination unit, configured to, according to an execution type of the data to be disclosed with a delay, determine a corresponding encryption algorithm.

For example, the encryption algorithm determination unit is configured to: when the data to be disclosed with a delay is numerical data for four arithmetic operations, select a fully homomorphic encryption algorithm; when the data to be disclosed with a delay is numerical data for addition operations, select an addition homomorphic encryption algorithm; when the data to be disclosed with a delay is numerical data for multiplication operations, select a multiplication homomorphic encryption algorithm; and when the data to be disclosed with a delay is text data that does not need to be operated, select an asymmetric encryption algorithm.

For example, the decrypting module 530 is configured to: decrypt the delay transaction data when delay disclosure conditions specified in the delay transaction request are met; or when receiving a disclosure instruction issued by an initiating user of the delay transaction request, determine that the set delay disclosure conditions are met, and decrypt the delay transaction data.

For example, the homomorphic encryption module 520 is configured to: during the execution of the delay transaction request, adopt an encryption key provided by an initiating user of the delay transaction request to homomorphically encrypt the determined data to be disclosed with a delay.

For example, the above apparatus further includes: a disclosure transaction request obtaining module, configured to, before decrypting the delay transaction data, obtain a disclosure transaction request initiated by the initiating user, and a decryption key from the disclosure transaction request.

For example, the decrypting module 530 includes: a decryption key providing unit, configured to, when the set delay disclosure conditions are met, provide a decryption key provided by the initiating user to a query user of the delay transaction data for decryption process.

For example, the decryption key providing unit is configured to: initiate uplink storage of the decryption key provided by the initiating user for disclosure; or perform locally association storage of the decryption key provided by the initiating user corresponding to the delay transaction request for decryption process when querying the delay transaction data.

For example, the above apparatus further includes: an index establishing module, configured to, after homomorphically encrypting the determined data to be disclosed with a delay, establish a correspondence between the encryption key and the encrypted delay data, and a bidirectional index.

For example, the homomorphic encryption module 520 is configured to: during the execution of the delay transaction request, determine read data and write data to be disclosed with a delay, in which the read data and write data are stored in a form of key-value pairs; and encrypt a key domain of the key-value pairs by using a non-homomorphic encryption algorithm, and encrypt a value domain of the key-value pairs by using a homomorphic encryption algorithm, to generate the delay transaction data containing the encrypted delay data.

For example, the blockchain nodes includes an application layer, a logical storage layer, and a physical storage layer, and during the execution of the delay transaction request, the homomorphic encryption module 520 is configured to determine the read data and write data to be disclosed with a delay, and encrypting the key domain of the key-value pairs by using the non-homomorphic encryption algorithm by: during the execution of the delay transaction request, determining the read data and write data to be disclosed with a delay, and encrypting the key domain of the key-value pairs by using the non-homomorphic encryption algorithm, through the logical storage layer.

For example, the above apparatus further includes: a data determining module, configured to, after obtaining the delay transaction request, according to instructions in the delay transaction request, determine that all or part of data of the delay transaction request as the data to be disclosed with a delay.

For example, the homomorphic encryption module 520 is further configured to: when local nodes are pre-execution nodes of the delay transaction request, perform the delay transaction request on read data in a plaintext state to determine write data in a plaintext state; and homomorphically encrypt the read data and the write data as the encrypted delay data of the data to be disclosed with a delay, and add the encrypted delay data to the delay transaction data.

For example, the decrypting module 530 is further configured to: when the set delay disclosure conditions are met, and a query request for the delay transaction data is received, decrypt the delay transaction data containing the encrypted delay data and feed backing the delay transaction data to a query user.

According to embodiments of the disclosure, the disclosure also provides an electronic device and a readable storage medium.

Figure 6:
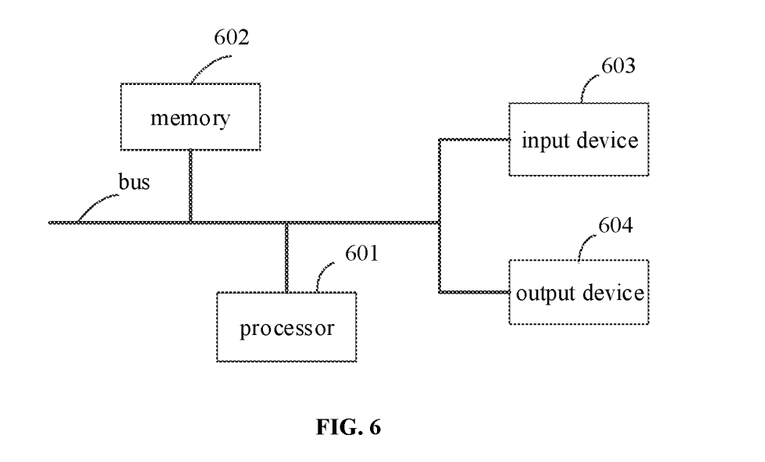
FIG. 6 is a block diagram of an electronic device for implementing a blockchain-based data processing method according to an embodiment of the disclosure.

FIG. 6 is a block diagram of an electronic device for implementing a method according to an embodiment of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the disclosure. The memory stores instructions executable by at least one processor, so that the at least one processor executes the blockchain-based data processing method according to the disclosure. The non-transitory computer-readable storage medium of the disclosure stores computer instructions, which are used to cause a computer to execute the blockchain-based data processing method according to the disclosure.

As a non-transitory computer-readable storage medium, the memory 602 is configured to store non-transitory software programs, non-transitory computer executable programs and modules, such as program instructions/modules corresponding to the blockchain-based data processing method in the embodiment of the disclosure (For example, the transaction request obtaining module 510, the homomorphic encrypting module 520 and the decrypting module 530 shown in FIG. 5). The processor 601 executes various functional applications and data processing of the server by running non-transitory software programs, instructions, and modules stored in the memory 602, that is, implementing the method in the foregoing method embodiment.

The memory 602 may include a storage program area and a storage data area, where the storage program area may store an operating system and application programs required for at least one function. The storage data area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may alternatively include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for implementing a blockchain-based data processing method may further include an input device 603 and an output device 604. The processor 601, the memory 602, the input device 603, and the output device 604 may be connected through a bus or in other manners. In FIG. 6, the connection through the bus is taken as an example. The input device 603 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical solutions of the embodiments of the disclosure, in the process of executing the acquired delay transaction request, the blockchain nodes process the determined data to be disclosed with a delay by introducing homomorphic encryption, which can ensure the security of the encrypted delay data without affecting data verification. Afterwards, the delay transaction data containing the encrypted delay data is stored on the uplink, and when it is determined that the set delay disclosure conditions are met, the delay transaction data stored in the blockchain is decrypted, to realize the delay disclosure of the uplink data in the blockchain, which provides a new idea for the delay disclosure of the uplink data.

It should be understood that the various forms of processes shown above can be used to reorder, add, or delete steps. For example, the steps described in this application can be executed in parallel, sequentially, or in different orders, as long as the desired results of the technical solutions disclosed in this application can be achieved, which is no limited herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A blockchain-based data processing method implemented by blockchain nodes, comprising:
   obtaining a delay transaction request and triggering execution of the delay transaction request;
   during the execution of the delay transaction request, homomorphically encrypting determined data to be disclosed with a delay, to generate delay transaction data containing encrypted delay data, wherein homomorphically encrypting determined data comprises:
      determining read data to be disclosed with a delay, wherein the read data to be disclosed with the delay, refers to data that needs to be read from local data during the execution of the delay transaction request;
      homomorphically encrypting the read data to be disclosed with a delay, to obtain encrypted read data;
      performing the delay transaction request based on the encrypted read data to generate encrypted write data, wherein the write data refers to the data to be updated after the execution of the delay transaction request; and
      adding the encrypted delay data to the delay transaction data, wherein the encrypted delay data comprises the encrypted write data, or the encrypted read data and write data and storing the delay transaction data on an uplink; and
   when set delay disclosure conditions are met, decrypting the delay transaction data.

2. The method according to claim 1, wherein during the execution of the delay transaction request, the method further comprises:
   during the execution of the delay transaction request, determining data to be disclosed with a delay; and
   according to an execution type of the data to be disclosed with a delay, determining a corresponding encryption algorithm.

3. The method according to claim 2, wherein determining the corresponding encryption algorithm according to the execution type of the data to be disclosed with a delay comprises:
   when the data to be disclosed with a delay is numerical data for four arithmetic operations, selecting a fully homomorphic encryption algorithm;
   when the data to be disclosed with a delay is numerical data for addition operations, selecting an addition homomorphic encryption algorithm;
   when the data to be disclosed with a delay is numerical data for multiplication operations, selecting a multiplication homomorphic encryption algorithm; and
   when the data to be disclosed with a delay is text data that does not need to be operated, selecting an asymmetric encryption algorithm.

4. The method according to claim 1, wherein when the set delay disclosure conditions are met, decrypting the delay transaction data comprises:
   decrypting the delay transaction data when delay disclosure conditions specified in the delay transaction request are met; or
   when receiving a disclosure instruction issued by an initiating user of the delay transaction request, determining that the set delay disclosure conditions are met, and decrypting the delay transaction data.

5. The method according to claim 1, wherein during the execution of the delay transaction request, homomorphically encrypting the determined data to be disclosed with a delay, comprises:
   during the execution of the delay transaction request, adopting an encryption key provided by an initiating user of the delay transaction request to homomorphically encrypt the determined data to be disclosed with a delay.

6. The method according to claim 5, wherein before decrypting the delay transaction data, the method further comprises:
   obtaining a disclosure transaction request initiated by the initiating user, and obtaining a decryption key from the disclosure transaction request.

7. The method according to claim 5, wherein when the set delay disclosure conditions are met, decrypting the delay transaction data comprises:
   when the set delay disclosure conditions are met, providing a decryption key provided by the initiating user to a query user of the delay transaction data for decryption process.

8. The method according to claim 7, wherein providing the decryption key provided by the initiating user to the query user of the delay transaction data comprises:
   initiating uplink storage of the decryption key provided by the initiating user for disclosure; or
   performing locally storage of the decryption key provided by the initiating user in association with the delay transaction request for decryption process when querying the delay transaction data.

9. The method according to claim 5, wherein after homomorphically encrypting the determined data to be disclosed with a delay, the method further comprises:
   establishing a correspondence between the encryption key and the encrypted delay data, and establishing a bidirectional index.

10. The method according to claim 1, wherein during the execution of the delay transaction request, homomorphically encrypting the determined data to be disclosed with a delay, to generate the delay transaction data containing the encrypted delay data, comprises:
    during the execution of the delay transaction request, determining read data and write data to be disclosed with a delay, wherein the read data and write data are stored in a form of key-value pairs, the read data to be disclosed with a delay, refers to data that needs to be read from local data during the execution of the delay transaction request, and the write data to be disclosed with a delay, refers to the data to be updated after the execution of the delay transaction request; and
    encrypting a key domain of the key-value pairs by using a non-homomorphic encryption algorithm, and encrypting a value domain of the key-value pairs by using a homomorphic encryption algorithm, to generate the delay transaction data containing the encrypted delay data.

11. The method according to claim 10, wherein the blockchain nodes comprises an application layer, a logical storage layer, and a physical storage layer, and during the execution of the delay transaction request, determining the read data and write data to be disclosed with a delay, and encrypting the key domain of the key-value pairs by using the non-homomorphic encryption algorithm, comprises:
during the execution of the delay transaction request, determining the read data and write data to be disclosed with a delay and encrypting the key domain of the key-value pairs by using the non-homomorphic encryption algorithm, through the logical storage layer.

12. The method according to claim 1, further comprising: according to instructions in the delay transaction request, determining that all or part of data of the delay transaction request as the data to be disclosed with a delay.

13. The method according to claim 1, wherein during the execution of the delay transaction request, homomorphically encrypting the determined data to be disclosed with a delay, to generate the delay transaction data containing the encrypted delay data, comprises:
when local nodes are pre-execution nodes of the delay transaction request, performing the delay transaction request on read data in a plaintext state to determine write data in a plaintext state, wherein, the read data refers to data that needs to be read from local data during the execution of the delay transaction request, and the write data refers to the data to be updated after the execution of the delay transaction request; and
homomorphically encrypting the read data and the write data as the encrypted delay data of the data to be disclosed with a delay, and adding the encrypted delay data to the delay transaction data.

14. The method according to claim 1, wherein when the set delay disclosure conditions are met, decrypting the delay transaction data comprises:
when the set delay disclosure conditions are met, and a query request for the delay transaction data is received, decrypting the delay transaction data containing the encrypted delay data and feed backing the delay transaction data to a query user.

15. An electronic device, comprising:
at least one processor; and
a memory connected in communication with the at least one processor; wherein,
the memory stores instructions executable by the at least one processor, and when the instructions are executed by the at least one processor, the at least one processor are caused to implement a blockchain-based data processing method comprising:
obtaining a delay transaction request and triggering execution of the delay transaction request;
during the execution of the delay transaction request, homomorphically encrypting determined data to be disclosed with a delay, to generate delay transaction data containing encrypted delay data, wherein homomorphically encrypting determined data comprises:
determining read data to be disclosed with a delay, wherein the read data to be disclosed with the delay, refers to data that needs to be read from local data during the execution of the delay transaction request;
homomorphically encrypting the read data to be disclosed with a delay, to obtain encrypted read data;
performing the delay transaction request based on the encrypted read data to generate encrypted write data, wherein the write data refers to the data to be updated after the execution of the delay transaction request; and
adding the encrypted delay data to the delay transaction data, wherein the encrypted delay data comprises the encrypted write data, or the encrypted read data and write data and storing the delay transaction data on an uplink; and
when set delay disclosure conditions are met, decrypting the delay transaction data.

16. The electronic device according to claim 15, wherein during the execution of the delay transaction request, homomorphically encrypting the determined data to be disclosed with a delay, to generate the delay transaction data containing the encrypted delay data, comprises:
during the execution of the delay transaction request, determining read data and write data to be disclosed with a delay, wherein the read data and write data are stored in a form of key-value pairs, the read data to be disclosed with a delay, refers to data that needs to be read from local data during the execution of the delay transaction request, and the write data to be disclosed with a delay, refers to the data to be updated after the execution of the delay transaction request; and
encrypting a key domain of the key-value pairs by using a non-homomorphic encryption algorithm, and encrypting a value domain of the key-value pairs by using a homomorphic encryption algorithm, to generate the delay transaction data containing the encrypted delay data.

17. The electronic device according to claim 15, wherein during the execution of the delay transaction request, homomorphically encrypting the determined data to be disclosed with a delay, comprises: during the execution of the delay transaction request, adopting an encryption key provided by an initiating user of the delay transaction request to homomorphically encrypt the determined data to be disclosed with a delay;
wherein when the set delay disclosure conditions are met, decrypting the delay transaction data comprises: when the set delay disclosure conditions are met, providing a decryption key provided by the initiating user to a query user of the delay transaction data for decryption process.

18. A non-transitory computer-readable storage medium storing computer instructions, wherein when the computer instructions are executed, a computer is caused to implement a blockchain-based data processing method comprising:
obtaining a delay transaction request and triggering execution of the delay transaction request;
during the execution of the delay transaction request, homomorphically encrypting determined data to be disclosed with a delay, to generate delay transaction data containing encrypted delay data, wherein homomorphically encrypting determined data comprises:
determining read data to be disclosed with a delay, wherein the read data to be disclosed with the delay, refers to data that needs to be read from local data during the execution of the delay transaction request;
homomorphically encrypting the read data to be disclosed with a delay, to obtain encrypted read data;
performing the delay transaction request based on the encrypted read data to generate encrypted write data, wherein the write data refers to the data to be updated after the execution of the delay transaction request; and
adding the encrypted delay data to the delay transaction data, wherein the encrypted delay data comprises the encrypted write data, or the encrypted read data and write data and storing the delay transaction data on an uplink; and when set delay disclosure conditions are met, decrypting the delay transaction data.

\* \* \* \* \*